W. H. KLOCKE.
REAR WHEEL FOR MOTOR VEHICLES.
APPLICATION FILED FEB. 2, 1920.

1,394,739.

Patented Oct. 25, 1921.

Inventor
William H. Klocke.
By his Attorney
Jas. H. Griffin.

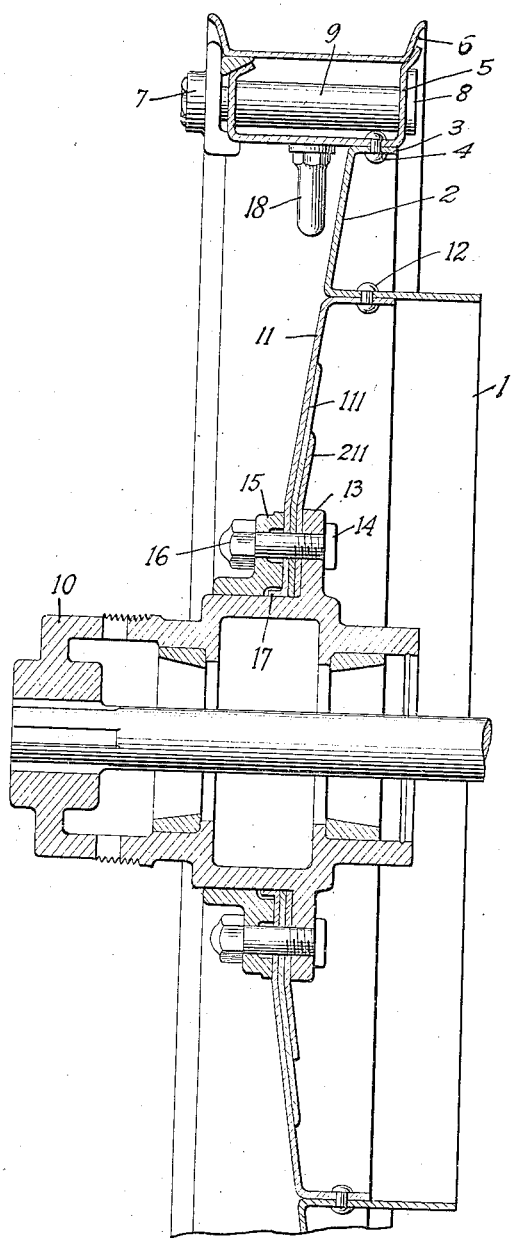
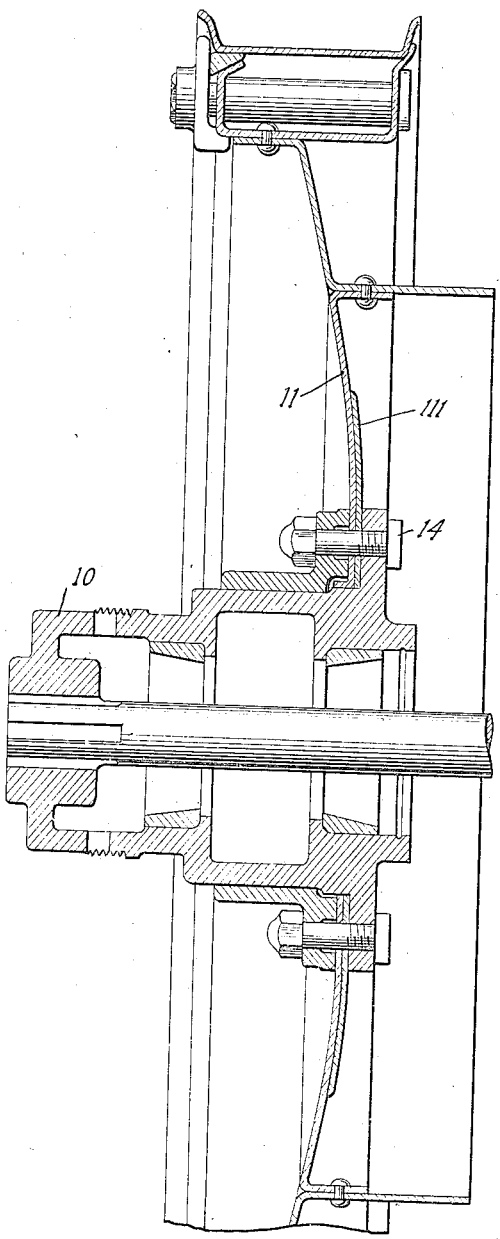

UNITED STATES PATENT OFFICE.

WILLIAM H. KLOCKE, OF WOODHAVEN, NEW YORK, ASSIGNOR OF ONE-HALF TO HARRY F. HUGHES, OF BROOKLYN, NEW YORK.

REAR WHEEL FOR MOTOR-VEHICLES.

1,394,739.      Specification of Letters Patent.      Patented Oct. 25, 1921.

Application filed February 2, 1920. Serial No. 355,729.

*To all whom it may concern:*

Be it known that I, WILLIAM H. KLOCKE, a citizen of the United States, residing at Woodhaven, county of Queens, and State of New York, have invented a certain new and useful Rear Wheel for Motor-Vehicles, of which the following is a specification.

This invention relates to vehicle disk wheels and is more particularly directed to the rear, or driving wheels of a motor vehicle. In wheels of this character the hubs are fixed on the axle shaft sections and the wheels are, in turn, rigidly secured to the hubs. Also, associated with such wheels are brake drums by means of which the vehicle may be braked through mechanism associated therewith.

In disk wheels, as heretofore constructed, the rims of the wheel are usually spaced from the hubs thereof by one or more plates or disks from which this type of wheel derives its name. The rims are, at times, formed integral with said disks or plates and, at other times, formed separate and bolted or riveted thereto. In practically all of these wheels, however, the disks are secured to the hub by a plurality of bolts or rivets disposed in annular relation about the hub and passing through a flange provided on the hub for this purpose. A wheel of this character may be used as either a front or rear wheel of the vehicle, but, when employed as a rear wheel, a brake drum is associated therewith by securing it to the hub by the same bolts or rivets which secure the disk to said hub.

While such structures are relatively easy to assemble and have met with more or less popular favor, they embody the inherent disadvantage of imposing too great a strain upon the hub bolts. It is well understood by those skilled in this art that one of the greatest strains to which a wheel is subjected is that which results from the quick application of the vehicle brakes. And long experience and study of these considerations have led me to believe that it is practically impossible to mount a brake drum on the hub of a rear wheel through the employment of the hub bolts, in the manner described, so permanently that it will withstand the wear and tear of hard usage, to which these parts are subjected, for any appreciable length of time. Attempts have been made to overcome the working loose of the parts by making such parts so heavy that disruption or distortion thereof could not occur and by using a specially prepared high-grade steel in the manufacture of these parts. Wheels so constructed are, however, considerably heavier than other forms of wheels and much more expensive.

My observations have shown that, for the normal operation of the drive wheel of the vehicle, great strength is really not required. In other words, the driving of the wheels from the motor is usually in the nature of a steady push, of such character that at no time it jeopardizes the bolt connection between the hub and the wheel disk. However, when the brakes are applied suddenly, the inertia and momentum of the car is suddenly imposed upon the bolts which secure the brake drum to the hub, with the result that the parts are strained and work loose.

With the foregoing considerations in mind, the object of the present invention is to greatly relieve the hub bolts from the strains of the braking operation. And this I preferably accomplish by dispensing with the connection between the brake drum and the hub and, in lieu, thereof, mounting the brake drum directly upon the rim of the wheel.

In one of the practical embodiments of the invention, the brake drum is formed with a flange which is directly secured to, and supports, the rim of the wheel, while the hub is spaced from said rim by one or more plates or disks secured to the brake drum and to the hub of the wheel. The conventional bolts may be employed to secure the disk or disks to the hub, as heretofore, and said disk may be bolted, riveted or otherwise secured to the drum.

Features of the invention, other than those adverted to will be apparent from the following detailed description read in conjunction with the accompanying drawings, as well as from the appended claims.

In the accompanying drawings, I have illustrated different practical embodiments of the invention, but the constructions therein shown are to be understood as illustrative only and not as defining limits of the invention.

Fig. 2 is a central section of said wheel, taken in a plane of the line 2—2 of Fig. 1; and Fig. 3 is a view corresponding to Fig. 2 but illustrating a slightly modified form of wheel construction.

Figure 1:
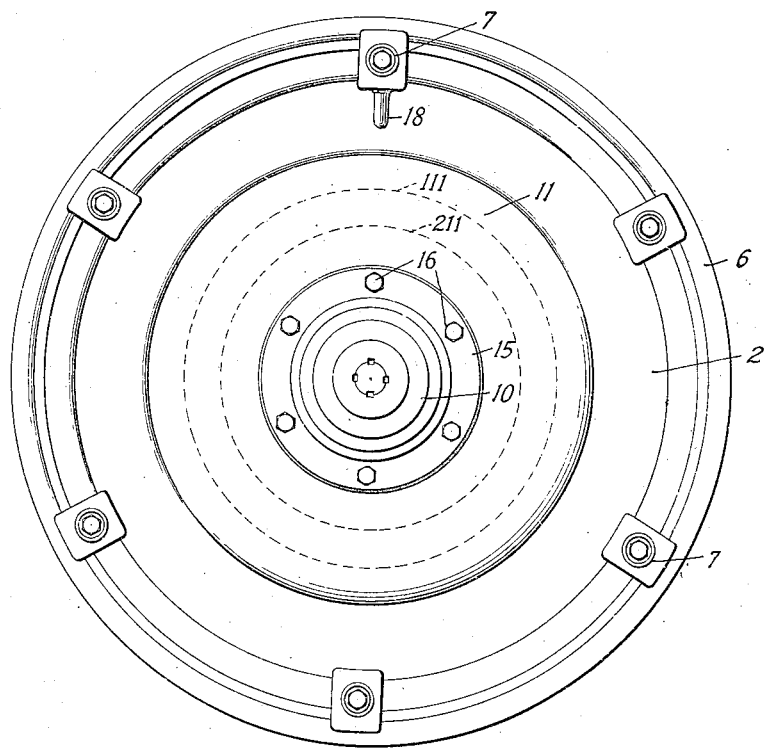
Figure 1 is a face view of a wheel, constructed in accordance with the present invention.

In carrying out the present invention, in accordance with the showing of Figs. 1 and 2, the brake drum 1 is provided with an outwardly extending flange 2, the marginal circumferential portion of which is bent over to form a supplemental flange 3, adapted to be secured by means of bolts or rivets 4 to the rim 5 of the wheel. In practice, the brake drum 1 may be formed integral with the flanges 2 and 3 and may be conveniently manipulated from sheet metal into the form shown through the use of suitable dies. The wheel rim 5 may be of any desired structure or material but is preferably formed from sheet metal bent up, as shown.

The rim 5 may be so constructed as to form a permanent rim adapted to directly receive a tire but is preferably so organized and formed that it may detachably receive a demountable rim 6 of any well-known conventional form. The demountable rim 6 is normally maintained in position on the permanent rim 5 by suitable means such as a plurality of clips 7 coöperating with tie bolts 8. When this construction is employed, spacers 9, in the form of short lengths of tubing, may be positioned to surround the shanks of the bolts 8 within the permanent rim to maintain the same in rigid, distended condition.

The hub 10, which is adapted to be associated with the wheel thus far described, may be spaced from the rim 5 in several ways but, in the preferred embodiment of the invention, the hub is supported from the brake drum by a disk or plate 11, the outer circumferential margin of which is riveted, bolted or otherwise secured to the brake drum 1 or its flange, and the inner, or central portion, of said plate being provided with an aperture through which the hub 10 may extend. The hub is provided with a flange 13 which over-lies a portion of disk 11 bordering its central aperture and conventional bolts 14 of any desired number are passed through alined openings in the flange 13 and disk 11, and through corresponding openings in the detachable flange 15 to receive nuts 16 for tightly securing the hub in position at the center of the disk. A flange 17 is preferably formed on the disk 11 adjacent its central aperture and this flange is adapted to engage with the hub to facilitate the assembly of the parts and assist in carrying the weight after assembling.

The sectional contour of the disk 11 may vary without departing from the invention but I preferably slightly dish said disk, as shown. Moreover, the disk 11 may be backed up by one or more additional disks 111 and 211, which are of progressively smaller diameters; and when this structure is employed all of said disks are preferably made somewhat thinner than if only one disk were employed, so that the leaf spring effect of these superimposed disks may be availed of to resist and compensate for lateral springs due to skidding or turning corners when the wheel is in use on the car.

The superimposing of a plurality of disks, in the manner specified, forms a basis of a companion application filed herewith.

In the construction of Fig. 3, substantially the same association of parts is shown as is illustrated in Figs. 1 and 2, but with this difference: in Fig. 2, the flange 3 is shown as secured to the rim 5, near the inner periphery thereof, whereas, in Fig. 3, the corresponding flange is shown as secured to the permanent rim near the outer periphery thereof. Experience has shown that the so-called "load center" of a wheel is nearer its inner periphery than its outer periphery and, thus, the construction of Fig. 2 is preferable since the flange 2 engages with the rim at load center thereof and a better structure results, from an engineering standpoint, than is the case in Fig. 3. However, in practice, a structure, such as shown in the latter figure, may be employed to good advantage, or, if desired, the flange 3 may be secured along the medial line of the rim. In the latter instance, a portion of the flange 2 would probably have to be cut away at the point where the tire nipple 18 is adapted to project through the rim, so as to allow of the manipulation of said nipple.

Figure 4:
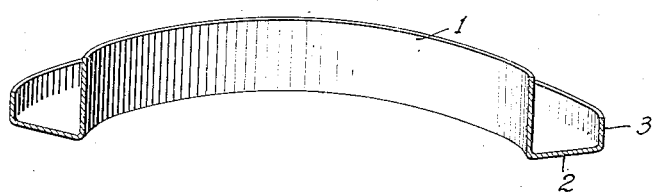
Fig. 4 is a perspective detail of the brake drum member of the wheel.

Numerous features of advantage will be manifest to those skilled in the art from a reading of the foregoing specification. The parts of the wheel structure may be easily and expeditiously manufactured and as easily assembled. Moreover, if, through accident, some portion of the wheel becomes distorted or broken, it may readily be replaced by new parts. This will be clear when it is noted that the drum portion is stamped up from a single piece, as shown in Fig. 4, and that the disks 111 and 211 are of the simplest form, these parts being secured together by bolts or rivets, as desired. In the construction of this invention, the braking strains are transmitted to the rim in such manner that the bolts which mount the hub relative to or space it from, the rim, are free from excessive strains. Accordingly, said bolts, being greatly relieved from ordinary braking strains, can resist, more efficiently, the driving strains and lateral stresses incident to normal operation of the wheel. The brake drum, or rather the flanges thereof, carry the weight imposed on the hub by the car, in the preferred embodiment of this invention, and the brake member, as shown in Fig. 4, may be made of heavier gage material, so as to withstand braking stresses, while the disks which support the hub may be made lighter to adequately support the weight of the car and, at the same time, provide the spring-like action for taking up lateral stresses.

From an engineering standpoint, the positioning of the flange 2 interiorly of the permanent rim, as shown, forms, in effect a T-channel or girder structure connecting the rim directly to the brake drum. Such a structure embodies maximum strength which renders the wheel capable of withstanding the greatest strains to which it may be possibly subjected during braking of the car.

The fundamental feature underlying the present invention resides in the fact that the braking of the car is accomplished independent of the drive. This feature clearly differentiates the disk wheel of this invention from all prior disk wheels wherein the brake drum is secured to the wheel by the same bolts which secure the disk to the hub, since it is through these bolts that the wheel is driven, as well as braked. In order that this fundamental feature may be clearly understood, the foregoing illustrative structures have been fully described, but it will be understood the details of construction may be changed and modified, in adapting the invention to wheels of slightly different design or esthetic appearance without departing from the spirit or substance of the invention, which is to be understood is as broadly novel as is commensurate with the appended claims.

It may be stated that when a plurality of disks are employed, as described, there will be absolutely no tendency of these disks to develop squeaks or other noises, since the interior of the brake drum, as regards the adjacent faces of said disks, is always exposed to the presence of oil which will adequately lubricate the parts and prevent undue friction.

The construction of wheel and brake described, in addition to possessing the advantages outlined, has another most important practical function or advantage. The disk portion of the wheel, due to its direct association with the brake, serves, by virtue of its extended surface, to quickly radiate the heat from the brake, thereby precluding any overheating of the latter, and the consequent disadvantages incident to such overheating. Moreover, the rim of the wheel being, naturally, kept cool, assists in absorbing heat from the disk portion of the wheel.

Having thus fully described the invention, what I claim as new and desire to secure by Letters Patent is:

1. A disk wheel embodying a rim, a hub, a brake drum, means for rigidly securing the brake drum to the rim, at least one disk secured at its center to the hub, and means, independent of the means which secures the brake drum to the rim, for securing the marginal portion of the disk to the brake drum.

2. A disk wheel embodying a rim, a hub, a brake drum rigidly mounted on the rim, and a disk secured to the hub and extending to and secured to the brake drum.

3. A disk wheel embodying a rim, a hub, an annular disk section rigidly secured at its outer margin to the rim and having a brake drum associated with its inner circumference, and a disk secured at its center to the hub and at its outer periphery to the brake drum.

4. A disk wheel embodying a rim, a hub, a disk rigidly secured to the hub and of a diameter enabling it to extend for a portion of the distance to the rim, an annular disk section secured at its inner periphery to the disk and at its outer periphery to the rim, and a brake drum carried by the annular disk section.

5. A disk wheel embodying a rim, a hub, a brake drum member mounted on the rim, and means for spacing the brake drum member from the hub, whereby the braking of the rim against rotation is transmitted directly to the rim through the brake drum member, and the normal driving of the wheel rim is transmitted from the hub through the means which connects the hub to the brake drum member and through the brake drum member to the rim.

In testimony whereof, I have signed my name to this specification.

WILLIAM H. KLOCKE.